United States Patent [19]

Boury et al.

[11] Patent Number: 5,174,368

[45] Date of Patent: Dec. 29, 1992

[54] COOLED REFRACTORY STRUCTURE AND MANUFACTURING PROCESS THEREFOR

[75] Inventors: Didier P. Boury; Louis G. Heraud, both of Bordeaux, France

[73] Assignee: Societe Europeenne de Propulsion, Suresnes, France

[21] Appl. No.: 727,998

[22] Filed: Jul. 10, 1991

[30] Foreign Application Priority Data

Jul. 13, 1990 [FR] France ............... 90 08972

[51] Int. Cl.⁵ .............................. F28F 13/14
[52] U.S. Cl. ........................ 165/146; 165/168; 60/267; 60/753; 428/610; 428/614
[58] Field of Search ............. 60/267, 753; 165/168, 165/169, 146; 416/241 B; 428/610, 614

[56] References Cited

U.S. PATENT DOCUMENTS

| | | | |
|---|---|---|---|
| 2,658,332 | 11/1953 | Nicholson | 60/35.6 |
| 2,794,316 | 6/1957 | Winternitz | 60/267 X |
| 2,962,221 | 11/1960 | Kunz | 60/267 X |
| 4,444,603 | 4/1984 | Yamatsuta et al. | 148/127 |
| 4,580,524 | 4/1986 | Lackey, Jr. et al. | 118/725 |
| 4,749,667 | 6/1988 | Jun et al. | 501/89 |
| 4,778,649 | 10/1988 | Niino et al. | 419/9 |
| 4,899,538 | 2/1990 | Shekleton | 60/39.465 |

FOREIGN PATENT DOCUMENTS 0260850 3/1988 European Pat. Off. .
8505352 12/1985 PCT Int'l Appl. .
1528160 10/1978 United Kingdom .

Primary Examiner—Allen J. Flanigan
Attorney, Agent, or Firm—Weingarten, Schurgin, Gagnebin & Hayes

[57] ABSTRACT

The structure consists of a composite material having a reinforcement texture and a matrix. The composition of the matrix varies practically without discontinuity, in the structure's thickness direction, from an essentially refractory material (13) in the region of the front face intended to be exposed to very high temperatures, up to a material that is essentially heat conductive (16). Cooling fluid circulation conduits (15) can be arranged within the structure at a portion where the matrix is essentially heat conductive.

6 Claims, 2 Drawing Sheets

COOLED REFRACTORY STRUCTURE AND MANUFACTURING PROCESS THEREFOR

BACKGROUND OF THE INVENTION

1. Field of the Invention

The present invention relates to cooled structures or structural components.

Some constructions require—or will require—refractory structural components capable of supporting long periods of contact with gases at extremely high temperatures, e.g. 1700° to 3400° C.

This in particular applies to combustion chamber walls of combined jet and rocket engines, or to parts of aerodynamic structures of hypersonic space planes, especially the nose tip, leading surfaces of wings and air intake fairings.

2. Prior Art

Walls made of a metallic material with no protective coating would require a considerable amount of cooling by fluid circulation. When the cooling fluid happens to be liquid hydrogen (one of the rocket engine fuels), this would lead to a substantial over-consumption of hydrogen, and a more complicated cooling circuit. A thermally protective coating, such as ceramic, could be formed on the metal walls. However, such a coating may turn out to be insufficiently effective and could, moreover, constitute a hazard in the event of it chipping off.

Despite their refractory nature, walls made of ceramic materials would also require some active cooling, albeit to a lesser extent than metallic walls.

The use of sintered ceramics would be difficult to envisage, owing to their insufficient mechanical resistance, shock resistance and toughness.

This is not the case with composite materials having a refractory matrix (carbon or ceramic), whose thermostructural properties are well known.

Refractory matrix composite materials consist of a fibrous preform made from refractory fibers (carbon fibers or ceramic fibers) densified by a ceramic that constitutes the matrix of the composite material.

The use of refractory matrix composite materials for the manufacture of cooled refractory structures raises a variety of problems.

In particular, it would be preferable, for an enhanced evacuation of the thermal flux, to have the structure made of a heat-conducting material on the side opposite to the one exposed to the high temperatures. But difficulties would then arise with the use of different materials needed to form the wall, on account of their differential expansions, these being considerable at the envisaged service temperatures.

In another approach, involving attempts to form channels or to integrate conduits in the composite for cooling fluid circulation, there would then arise a difficult problem as regards sealing. The integration of conduits in a refractory composite material causes other difficulties that are also connected with differences in the thermal expansion coefficients between the conduits and the refractory composite material.

SUMMARY OF THE INVENTION WITH OBJECTS

It is therefore an object of the present invention to provide a cooled refractory structure that uses a ceramic matrix composite material and can serve as a refractory wall which resists to very high temperatures, has good mechanical characteristics, and is amenable to cooling.

According to the present invention, the above object is achieved by a structure formed of a composite material having a reinforcement texture and a matrix, the composition of the matrix varying substantially without discontinuity along a thickness direction of the structure, from being an essentially refractory material, in the region of a front face intended to be exposed to very high temperatures, to being an essentially heat conductive material.

Cooling of the structure can be achieved by radiation from the rear face, opposite the front face, in the region of which the matrix is essentially heat conductive, and/or by scavenging the rear face with a fluid.

Cooling fluid circulation conduits can also arranged within the structure, in a portion thereof where the matrix is essentially heat conductive.

The present invention also has for object a process for the manufacture of such a composite material refractory structure having a graded composition matrix.

According to the invention, such a process comprises the steps of:

making a fibrous preform whose shape corresponds substantially to that of the structure being manufactured, and whose volume ratio of fibers decreases in along the thickness of the preform, from a first face thereof corresponding to front face of the structure intended to be exposed to very high temperatures, forming a refractory coating on the fibers of the preform by chemical vapor infiltration, said infiltration being pursued up to a substantially complete occupation of the accessible pores of the preform in the region of said first face, and forming a matrix from a heat conductive material within the residual accessible pores.

According to a particular implementation of the inventive process, cooling fluid circulation conduits are placed near a second face of the preform, opposite the first face, and the matrix made of heat conductive material is formed within the accessible pores of the preform and around the conduits.

The fibrous preform may, for instance, be made by superposing layers, the layers having variable densities and being distributed in the preform in order to obtain the required degree of fiber volume ratio.

The chemical vapor infiltration step makes it possible to deposit a refractory coating of substantially constant thickness on the fibers of the preform. The infiltration is pursued up to a substantially complete occupation of all the accessible pores of the preform, in the vicinity of the first face thereof. However, because of the variation in the fiber volume ratio, the refractory material does not occupy all the available pores of the preform, and there thus remains a residual accessible porosity that increases with the distance away from the first face. Once the heat conductive material is introduced within the residual pores, there is then obtained a matrix that passes without discontinuity from an essentially refractory nature in the region of the face intended to be exposed to high temperatures, to an essentially heat conductive nature in the region of the opposite face.

The present invention thus makes it possible to produce a structure that combines the functions of a refractory wall, good mechanical characteristics, by virtue of the composite nature of the constituent material, and cooling capability. Moreover, strains of thermal origin are minimized since the hottest part of the structure is the one in which the matrix is essentially refractory and has a lower expansion coefficient, while the least hot part is the one in which the matrix is essentially formed of heat conductive matter which has a higher expansion coefficient. Accordingly, the structure according to the present invention possesses good resistance to thermal shocks and to large thermal gradients between the front and rear surfaces.

The refractory material deposited by the chemical vapor infiltration is chosen among carbon and ceramics. The latter notably include carbides (e.g. silicon carbide, zirconium carbide, borium carbide), borides (e.g. zirconium diboride, titanium diboride), and oxides (e.g. zirconia).

The heat conductive material is e.g. deposited in a molten state and is chosen among semi-refractory materials, which notably include silicon, metals and metal alloys (which can include very good heat conductors, such as aluminum or copper), and some glass compounds.

Other methods may be used to insert the heat conductive matrix, such as liquid impregnation by a precursor of the matrix, followed by a thermal treatment to transform the precursor.

The fibrous preform that constitutes the composite material reinforcement is made of refractory fibers chosen among carbon fibers and ceramic fibers, such as silicon carbide, zirconia, etc.

BRIEF DESCRIPTION OF THE DRAWINGS

Two exemplary embodiments of the invention shall now be described as non-limiting examples, with reference to the appended drawings in which.

DETAILED DESCRIPTION OF THE PREFERRED EMBODIMENTS

Figure 1A:
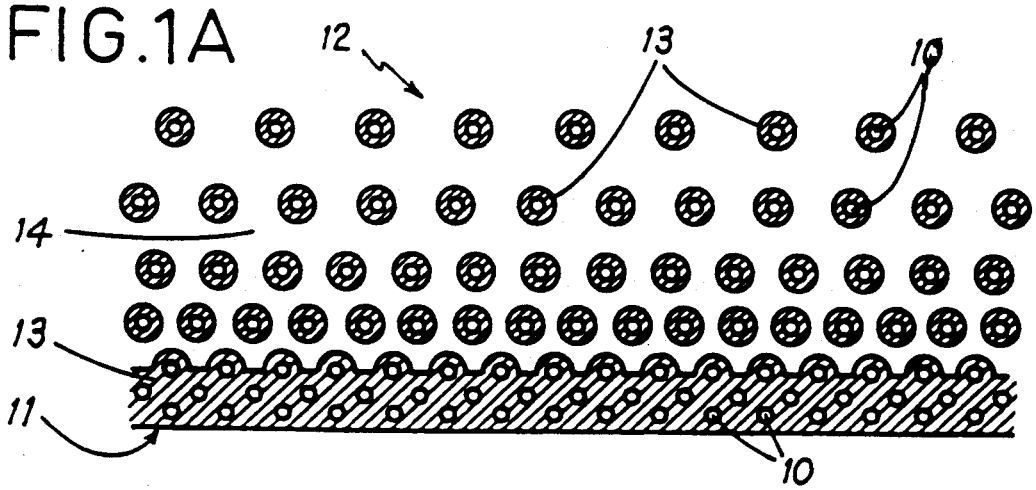
FIGS. 1A to 1C are highly schematic illustrations of a cross-section through a structure in accordance with the present invention, at different stages in its manufacture.
Figure 1B:
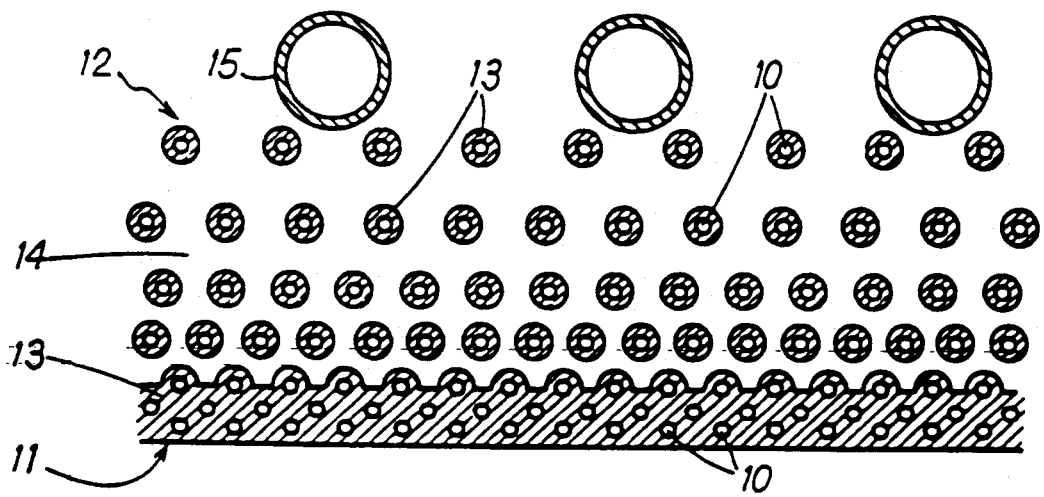
Figure 1C:
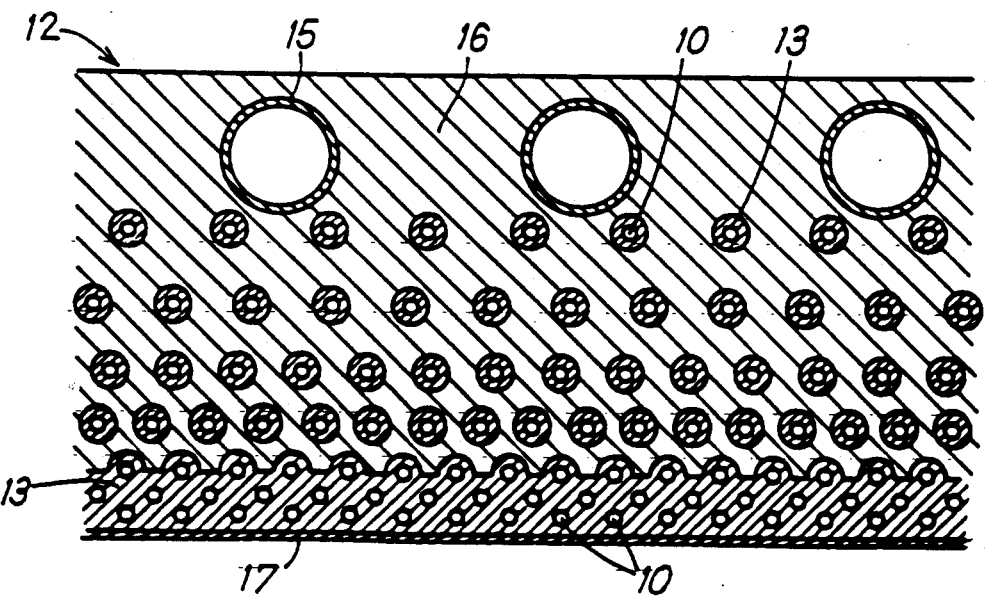

In the example illustrated in FIGS. 1A to 1C, a graded composition matrix is obtained from a fibrous preform in which the fiber volume ratio varies from one face of the preform to the opposite face.

Here, the term fiber volume ratio is to be understood as the percentage of a unit volume of preform effectively occupied by the fibers.

In order to produce a preform with a variable volume ratio, one can e.g. use two-dimensional textures of different densities, such as tightly woven cloths or laps of threads in cable form, which have a relatively high density, and webs of fibers which have a relatively small density.

The fibrous preform has a shape that corresponds to that of the texture, or element of texture, to produce. Incidentally, it will be noted that an advantage of the present invention is that it can apply to the manufacture of large-size structures, and even those of complex shape and small thickness, by using known methods for the manufacture of composite material components.

The fibrous preform is prepared by superposing layers of two-dimensional textures made of fibers 10, with a majority of high density layers arranged on the face 11 corresponding to the structural face to be exposed to high temperatures, and a majority of low density fibers on the face 12 opposite to face 11 (FIG. 1A).

For instance, layers of cloth are placed at the level of face 11, optionally with a fiber web layer interleaved between two cloth layers, and the proportion of fiber web layers is gradually increased as the proportion of cloth layers decreases in correlation, to finish with only fiber webs at the level of face 12.

Advantageously, the layers are linked together by needling, the latter being effected as and when the layers are being superposed, i.e. each time a new layer, or new group of layers, is added.

The fibrous preform may e.g. be made from carbon fibers, with a fiber volume ratio varying, say, from a value of between 30 and 50% in the vicinity of face 11, to a value varying between 5 and 15% in the vicinity of face 12.

The fiber volume ratio must have a bounded maximum value in order to leave an accessible porosity for the densification by the matrix, and a minimum value that is above a certain threshold to enable the fibers to contribute effectively to the mechanical strength of the structure.

The thus-produced preform is held e.g. in a holding tool, and is densified by chemical vapor infiltration of a refractory material, such as carbon or silicon carbide. There is thus formed a layer of substantially constant thickness on the fibers. The infiltration is pursued until the thickness of the coating becomes such that the accessible pores of the preform in the vicinity of face 11 are totally occupied by the refractory material 13.

Because of the decrease in the fiber volume ratio in going away from face 11, the refractory coating formed on the fibers leaves a residual porosity 14 that progressively becomes more and more important.

Cooling fluid conduits or tubes 15 may be placed at the level of face 12 of the preform (FIG. 1B).

Next, a heat conductive material 16, such as silicon, is flowed in a molten state to terminate the densification of the fibrous preform, by occupying the residual pores 14 and embedding the tubes 15 (FIG. 1C).

The flow of conductive material 16 can be carried out in a mold that gives the structure its final shape. The tubes 15 are preferably held in place at set positions in the mold, so as not to compress or distort the pre-densified preform, by simply being layed down on the face 12 of the latter.

An anti-oxidization protective coating 17 can be formed on face 12. This coating can e.g. be in the form of a refractory layer, such as silicon carbide, obtained by chemical vapor deposition. It can be completed by depositing a layer of refractory glass having healing properties to fill in any cracks.

The material for the tubes 15 is chosen to be compatible with—and not corrodable by—the heat conductive matrix 16 or the cooling fluid, which can e.g. be sodium, lithium or hydrogen.

Figure 2A:
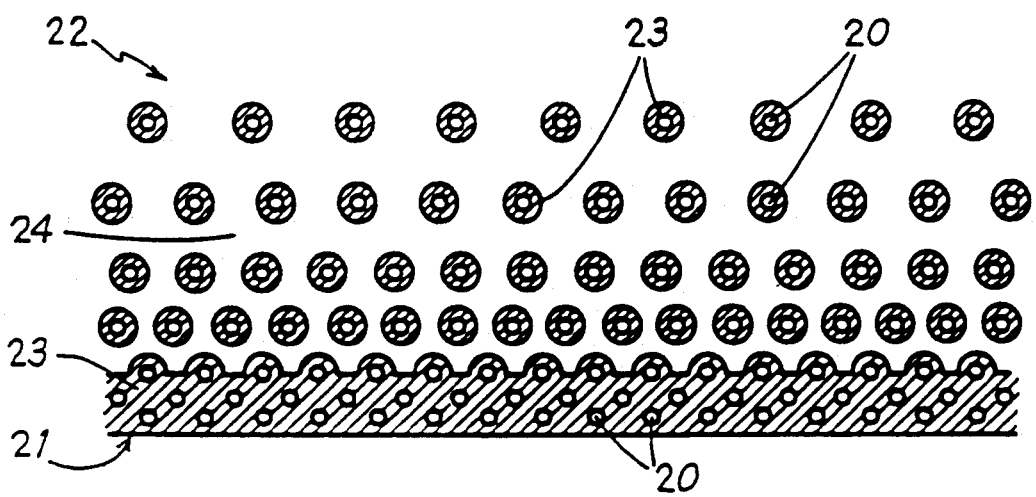
FIGS. 2A and 2B are highly schematic illustrations of a cross-section through another structure in accordance with the invention at different stages in its manufacture.
Figure 2B:
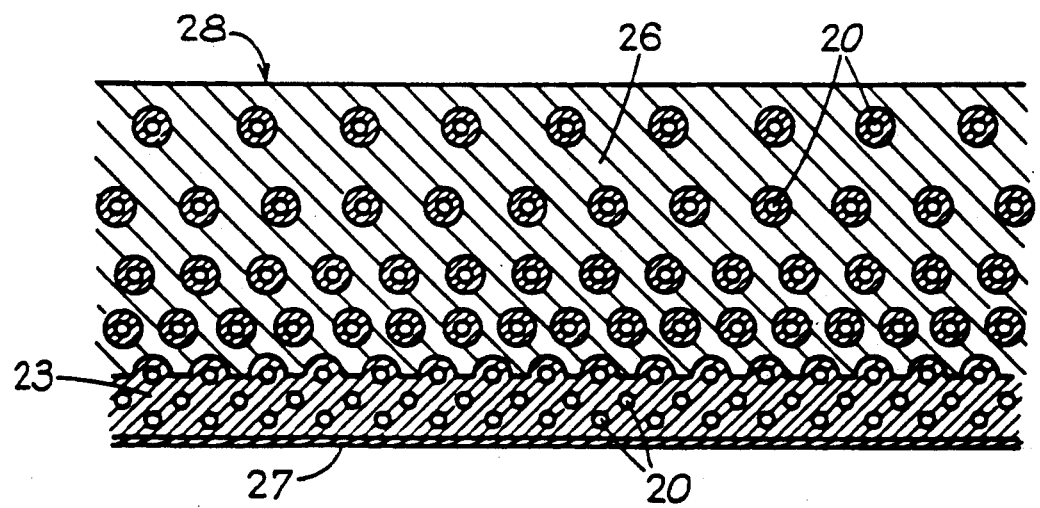

FIGS. 2A and 2B show another structure in accordance with the present invention.

As in the previous embodiment, a fibrous preform with a graded fiber volume ratio is formed by superposing and needling layers of two-dimensional textures formed of fibers 20. A majority of high density layers is arranged at the level of the face 21 corresponding to the face of the structure to be exposed to high temperatures, and a majority of low density layers is arranged at the level of face 22, opposite to face 21 (FIG. 2A).

The preform is densified by chemical vapor infiltration to form a refractory material coating 23 on the fibers. This coating can be can silicon or silicon carbide. The densification is pursued until the pores accessible at the level of face 21 are virtually all occupied, leaving a residual porosity 24 that increases in the direction of face 22.

Heat conductive material 26, such as silicon, is flowed in a molten state to terminate the densification of the preform by occupying the residual pores 24 (FIG. 2B). This flow of matrix material 26 can be effected in a mold that gives the structure its final shape.

An anti-oxidization protective coating 27 can be formed on the front face 22.

In use, the structure is cooled by radiation from its rear face 28.

The cooling capacity can be improved by scavenging the rear face 28 with a cooling fluid.

The amount of radiation can also be raised by means of fins formed on the rear surface 28. These fins can be molded as a single piece with the conductive matrix 26, or comprised of a metallic coating deposited over the rear face 28, e.g. by plasma projection or chemical vapor infiltration.

Finally, cooling fluid circulation conduits can be affixed to the rear face 28.

As already indicated, an essential advantage of the present invention is to enable the construction of structure that simultaneously fulfils the functions of a refractory wall, good mechanical characteristics, and cooling capability, with a continuity in its constituent material, without interfaces.

Another advantage lies in the relative simplicity of the manufacturing process, which is based on techniques already known in the manufacture of composite material parts. As already indicated, these techniques are moreover amenable to the manufacture of large and thin structures having complex shapes.

Finally, the invention makes it possible to obtain remarkably light structures. For instance, an 8 mm (approx. 0.32") thick structure, such as shown in FIG. 1C, and made from a carbon fiber preform with matrix having a silicon carbide refractory part and a silicon thermally conductive part, and thin molybdenum tubes of 3 mm (approx. 0.085") diameter, has a density in the region of 15 to 20 kg/m$^2$ (approx. 3 to 4 lb/sq. ft.).

What is claimed is:

1. A cooled refractory structure having a front face intended to be exposed to very high temperatures, wherein said structure is formed of a composite material having a fibrous preform including a fibrous reinforcement texture and a matrix, the composition of the matrix varying substantially without discontinuity along a thickness direction of the structure, from being an essentially refractory material, in the region of a front face intended to be exposed to very high temperatures, to being an essentially heat conductive material said fibrous preform comprising fibers having a nonuniform density distribution.

2. The structure of claim 1, wherein cooling fluid circulation conduits are provided within said structure, at a part thereof where said matrix is essentially heat conductive.

3. The structure of claim 1, wherein said fibrous reinforcement texture is made of fibers selected from a group consisting of carbon fibers and ceramic fibers.

4. The structure of claim 1, wherein said composite material has a volume ratio of fibers that decreases along the thickness direction of said structure from said front face.

5. The structure of claim 1, wherein said essentially refractory material forming a part of said matrix is selected from a group consisting of carbon and ceramic.

6. The structure of claim 1, wherein said essentially heat conductive material forming a part of said matrix is selected from a group consisting of silicon, metals, metal alloys, and glass compounds.

* * * * *